(12) United States Patent
Guattari et al.

(10) Patent No.: US 10,189,672 B2
(45) Date of Patent: Jan. 29, 2019

(54) METHOD FOR PRODUCING AN OPTICAL FIBER COIL, OPTICAL FIBER COIL AND OPTICAL FIBER INTERFEROMETER

(71) Applicant: IXBLUE, Saint-Germain-en-Laye (FR)

(72) Inventors: Frederic Guattari, Aubervilliers (FR); Pascal Simonpietri, Cormeilles en Parisis (FR); Alain Claire, L'Isle Adam (FR)

(73) Assignee: IXBLUE, Saint-Germain-en-Laye (FR)

( * ) Notice: Subject to any disclaimer, the term of this patent is extended or adjusted under 35 U.S.C. 154(b) by 0 days.

(21) Appl. No.: 15/567,451

(22) PCT Filed: Apr. 20, 2016

(86) PCT No.: PCT/FR2016/050924
§ 371 (c)(1),
(2) Date: Oct. 18, 2017

(87) PCT Pub. No.: WO2016/170271
PCT Pub. Date: Oct. 27, 2016

(65) Prior Publication Data
US 2018/0162679 A1    Jun. 14, 2018

(30) Foreign Application Priority Data
Apr. 21, 2015  (FR) .................................... 15 53542

(51) Int. Cl.
*G01C 19/72* (2006.01)
*B65H 54/02* (2006.01)
(Continued)

(52) U.S. Cl.
CPC ............. *B65H 54/02* (2013.01); *B65H 55/04* (2013.01); *G01C 19/722* (2013.01); *G01J 9/02* (2013.01);
(Continued)

(58) Field of Classification Search
CPC ..... G01C 19/72; G01C 19/721; G01C 19/722
See application file for complete search history.

(56) References Cited

U.S. PATENT DOCUMENTS 4,856,900 A    8/1989  Ivancevic
5,528,715 A *  6/1996  Goettsche ............ G01C 19/722
                                                 242/159
(Continued)

FOREIGN PATENT DOCUMENTS

| CN | 104 251 698 | 12/2014 |
| JP | 2011-089908 | 5/2011 |
| WO | WO 00/36441 | 6/2000 |

OTHER PUBLICATIONS

International Search Report, PCT/FR2016/050924; dated Jul. 25, 2016.
(Continued)

*Primary Examiner* — Jonathan Hansen
(74) *Attorney, Agent, or Firm* — Young & Thompson (57) ABSTRACT

Disclosed is a method for producing an optical fiber coil including the following steps: a. symmetrical winding of an optical fiber around a shaft, the winding forming a pattern including a same number N of layers of each half of the optical fiber, one layer including a set of turns of optical fiber and spaces between adjacent turns, the winding forming a sectored arrangement including a regular stacking area including at least one continuous sealing surface between two layers of adjacent turns, and an overlap area where portions of optical fiber linking different turns cross each other; b. infiltration of a glue through an external surface of the overlap area in such a way that the glue infiltrates into the spaces located between adjacent turns in the regular stacking area.

20 Claims, 3 Drawing Sheets

(51) Int. Cl.
*B65H 55/04* (2006.01)
*G02B 6/44* (2006.01)
*G01J 9/02* (2006.01)
*G02B 6/02* (2006.01)
*G02B 6/024* (2006.01)

(52) U.S. Cl.
CPC ......... *G02B 6/024* (2013.01); *G02B 6/02042* (2013.01); *G02B 6/4457* (2013.01); *G02B 6/4458* (2013.01); *B65H 2701/312* (2013.01); *G01J 2009/0226* (2013.01); *G01J 2009/0276* (2013.01)

(56) References Cited

U.S. PATENT DOCUMENTS

| | | | |
|---|---|---|---|
| 2003/0053067 A1* | 3/2003 | Hashimoto | G01C 19/722 356/465 |
| 2005/0098675 A1* | 5/2005 | Kim | G01C 19/722 242/445.1 |

OTHER PUBLICATIONS

Jun Chen et al: "Enhanced environmental performance of fiber optic gyroscope by an adhesive potting technology". Appli ed Optics, vol. 54, No. 26, Sep. 2, 2015 (Sep. 2, 2015), p. 7828, XP055257616, Washington, DC; US ISSN: 0003-6935, D0I: 10.1364/A0.54. 007828 figures 1,3,10.

* cited by examiner

METHOD FOR PRODUCING AN OPTICAL FIBER COIL, OPTICAL FIBER COIL AND OPTICAL FIBER INTERFEROMETER

TECHNICAL FIELD

The present invention relates to the sensors based on an optical fiber coil, such as the fiber-optic gyroscopes, and to the making of optical fiber coils used in such sensors.

More precisely, the invention relates to a method of making a symmetrical-winding optical fiber coil that allows reducing the effects of thermally-induced non-reciprocities.

STATE OF THE ART

A Sagnac-ring fiber-optic interferometer allows measuring the phase shift between two waves having travelled through a same optical fiber coil in opposite directions. This type of interferometric sensor is implemented in a fiber-optic gyroscope in which the measured phase shift allows deducing therefrom a measurement of rotation about the coil axis. A Sagnac-ring fiber-optic interferometer can also serve as a magnetic-field sensor, the phase shift being function of the magnetic field by Faraday magneto-optic effect (The Fiber-Optic Gyroscope, Hervé Lefèvre, Artech House).

To increase the sensitivity of a fiber-optic gyroscope, it is known to increase the length of the optical fiber in the coil, and hence the number of turns, or windings, of the fiber coil.

However, a fiber-optic gyroscope is subjected to time drifts. Generally, it is desired to improve the stability of a fiber-optic gyroscope to aim, for example, at a drift lower than 0.01 degree/hour. This stability involves in particular a mechanical and thermal stability of the optical fiber coil.

The mechanical stability of the coil is generally ensured by the application of a glue (potting material) on the optical fiber as the winding goes along.

Moreover, it is known that the local variations of temperature are liable to induce non-reciprocities in a Sagnac-ring fiber-optic interferometer sensor (The Fiber-Optic Gyroscope, Hervé Lefèvre, Artech House, Chapter 6.1). In particular, the Shupe effect is due to the local differences of thermal drifts at different places of the coil. Indeed, a local variation of temperature in the optical fiber induces a local variation of the refractive index in the optical fiber, which produces an additional phase shift between two counter-propagating waves.

It is possible to compensate for the differences of temperature at symmetrical positions with respect to the middle of the optical fiber. For that purpose, different types of symmetrical coil windings have been proposed, wherein the winding of an optical fiber is started by the middle of the fiber and is continued by alternating layers coming from each half-length of the optical fiber. This type of winding allows placing the segments of the fiber symmetrical with respect to the middle of the fiber close to each other.

In the present document, it is understood by layer of turns (or, in short, layer), one or several turns of an optical fiber coil placed at a same distance from the axis of the optical fiber coil. In a same layer, the turns generally come from a same half-length of fiber and are wound in a helix around the coil axis. It is herein understood by half-length or half of optical fiber a portion of the optical fiber that extends from the middle of the optical fiber, i.e. the point located at equal distance from the ends of the optical fiber, to one of the ends of the optical fiber.

Figure 1:
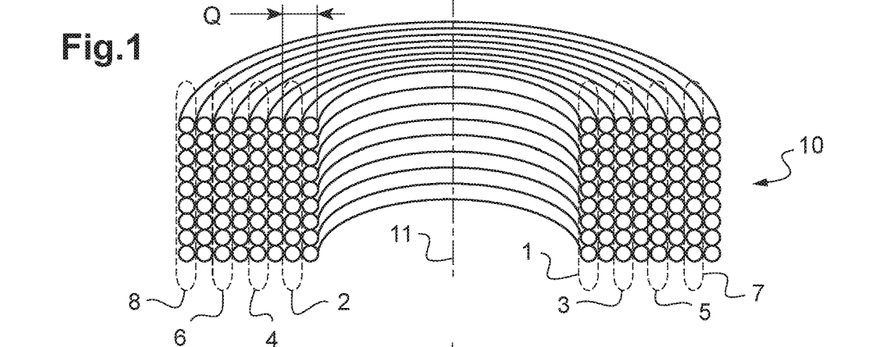
FIG. 1 schematically shows a sectional view of an optical fiber coil having a dipolar winding.

Hence, in a symmetrical winding of the dipolar type, a layer coming from one half-length of the optical fiber and another layer coming from the other half-length of the optical fiber are alternately wound, starting from the middle of the optical fiber and going away from the coil axis. FIG. 1 illustrates a sectional view of a coil 10 of optical fiber having a dipolar winding. The sections of optical fiber denoted by an odd number come from a first half of the optical fiber and the sections of optical fiber denoted by an even number come from the second half of the optical fiber. The first layer of turns 1, which is the closest to the axis 11 of the coil, includes only turns coming from the first half of the optical fiber. The second layer of turns 2, which is arranged around the first layer of turns 1, includes only turns coming from the second half of the optical fiber. The pattern Q so formed of two alternated layers is repeated, so that the dipolar-winding coil includes a total number of layers equal to a multiple of two. Hence, in a dipolar coil, the odd layers 1, 3, 5, 7 all come from the first half of optical fiber and the even layers 2, 4, 6, 8 all come from the second half of optical fiber.

Figure 2:
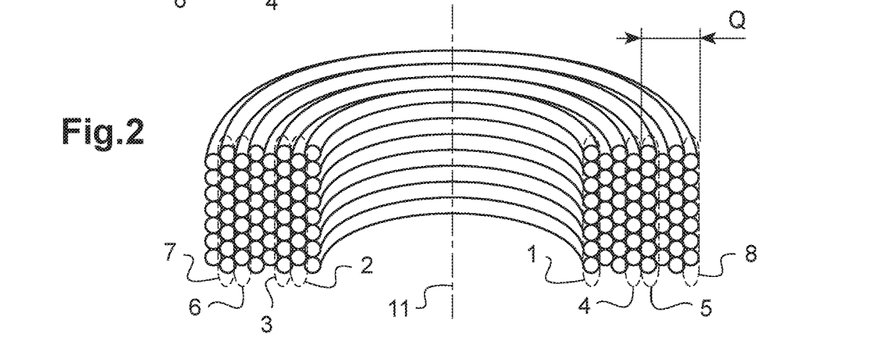
FIG. 2 schematically shows a sectional view of a coil having a quadrupolar winding.

In a quadrupolar symmetrical winding, a pattern consisted of four layers arranged as follows, starting from the middle of the optical fiber and going away from the coil axis: a first layer coming from a first half-length of the optical fiber, two layers coming from the other half-length of the optical fiber and a fourth layer coming from the first half-length of the optical fiber, is periodically repeated. FIG. 2 illustrates a sectional view of a coil 10 of optical fiber having a quadrupolar winding. The same reference signs denote the same elements as in FIG. 1. The first layer of turns 1, which is the closed to the axis 11 of the coil 10, includes only turns coming from the first half of the optical fiber. The second layer 2 and the third layer 3, which are arranged around the first layer 1, include only turns coming from the second half of the optical fiber. A fourth layer of turns 4, arranged around the third layer of turns 3, includes only turns coming from the first half of optical fiber. The pattern Q so formed of four layers is repeated periodically, so that the quadrupolar-winding coil includes a total number of layers equal to a multiple of four. Hence, in a quadrupolar coil, the layers 1, 4, 5, 8 all come from the first half of optical fiber and the layers 2, 3, 6, 7 all come from the second half of optical fiber.

Similarly, in an octopolar symmetrical winding, a pattern consisted of eight layers arranged as follows, starting from the middle of the optical fiber and going away from the coil axis: a first layer coming from a first half of the optical fiber, two layers coming from the second half of the optical fiber, a fourth layer coming from the first half of the optical fiber, a fifth layer coming from the second half of the optical fiber, two layers coming from the first half of the optical fiber and a eighth layer coming from the second half of the optical fiber, is periodically repeated.

The dipolar, quadrupolar or octopolar symmetrical winding allows reducing the Shupe effect.

Nevertheless, other thermally induced effects exist. In particular, time variations of the temperature gradient may induce constraints in the optical fiber coil.

A optical fiber coil has a composite structure essentially consisted of an optical fiber coated with a glue, also called potting material. In the case of a self-supporting coil, the glue acts as a mechanical support for the coil. The glue represents about 20% of the volume of an optical fiber coil. The constraints thermally induced in an optical fiber coil depend in particular on the spatial homogeneity of this coil. for example, the presence of bubbles in the glue is liable to produce dissymmetrical local constraints in the coil. However, the modelling of the constraint effects in an optical fiber coil is very complex due to the composite structure of this coil.

Technical Problem

There hence exists a need for a system and a method for making an optical fiber coil having a great mechanical and thermal stability over time, which has a spatially homogeneous structure, and in particular a homogeneous spatial distribution of the glue in the optical fiber coil, with no bubble.

One of the objects of the invention is to increase the stability over time of a fiber-optic gyroscope.

Another object of the invention is to improve the spatial homogeneity of an optical fiber coil, in order to reduce the constraint effects and the thermal drifts.

Another object of the invention is to increase the reproducibility, the reliability and/or the quality of a method of making an optical fiber coil.

More precisely, one of the objects of the invention is to propose a method of applying glue to an optical fiber coil that allows obtaining, reliably and reproducibly, an optical fiber coil that has an homogeneous structure.

Still another object of the invention is to propose a method of applying glue to an optical fiber coil that is rapid.

The present invention has for object to remedy the drawbacks of the prior art and relates more particularly to a method of making a symmetrical-winding optical fiber coil comprising the following steps:

a. winding an optical fiber around an axis, the winding starting from a point of the optical fiber located at equal distance from the two ends of the optical fiber, the winding forming a pattern comprising a same number N of layers of each half of the optical fiber, where N is a natural integer, a layer comprising a set of turns of optical fibers and spaces located between adjacent turns, the turns of a layer coming from a same half of the optical fiber and being placed at a same distance from the coil axis, and said winding forming a coil having a sectored arrangement comprising, on the one hand, a regular stacking area in which the turns of optical fiber of a layer are juxtaposed to the turns of the adjacent layer(s), so as to form at least one continuous sealing surface between two layers of adjacent turns and, on the other hand, an overlap area in which portions of optical fiber linking different turns of a same layer and/or different layers of the winding cross each other;

b. making a glue infiltrate into the sectored-arrangement coil through an external surface of the overlap area, so that the glue infiltrates along at least one continuous path of communication into the spaces located between adjacent turns in the regular stacking area, up to said at least one sealing surface.

The method allows applying glue to the optical fiber coil after the full winding step and not at each winding of a layer of turns of the coil. Moreover, the distribution of the glue in the volume of the optical fiber coil is more homogeneous than the distribution obtained after a conventional method of application of glue to each turn and/or to each layer of the optical fiber coil.

The better spatial homogeneity of the glue in an optical fiber coil allows reducing the constraints induced by variations of temperature gradient in the optical fiber coil. Finally, the stability of a fiber-optic gyroscope based on an optical fiber coil resulting from the method of making of the invention is improved and the drift of the measurements over time is reduced.

This method allows a better repeatability of the performances of optical fiber coils and hence a better quality of the method of making of optical fiber coils.

On the other hand, this method facilitates the design of the winding machine and allows the visualization of the coil. These two conditions are essential for the automation of the method.

According to a particular and advantageous aspect of the invention, the winding is of the quadrupolar or octopolar type.

According to a particular and advantageous aspect of the invention, the adjacent turns of a first layer are arranged so as to form a groove between adjacent turns, and the turns of another adjacent layer are arranged in a staggered manner in the groove of the first layer in the regular stacking area.

According to a particular embodiment of the method of making, before step b), the axis of the optical fiber coil is arranged horizontally and the overlap area is arranged at the vertical of the coil axis, and the step b) comprises a step b1) of applying the glue to the overlap area, then a step b2) of making the glue infiltrate between the turns of the coil, by gravity and/or by capillarity and/or by suction.

According to a particular and advantageous embodiment of the method of making, before step b), the optical fiber coil is placed in a vacuum chamber so that the space between the turns of the coil is vacuumed, and the step b) comprises a step of applying the glue under vacuum to the overlap area; then a step of breaking the vacuum in the vacuum chamber, so that the glue infiltrates by suction between the turns of the coil due to a difference of pressure between the vacuum chamber and the spaces located between the turns of the coil.

The invention also relates to a symmetrical-winding optical fiber coil having an axis and comprising an optical fiber, said optical fiber being wound around the coil axis from the middle of the optical fiber, the winding of the optical fiber forming a pattern comprising a same number N of layers of each half of the optical fiber, where N is a natural integer, a layer comprising a set of turns of optical fiber and of spaces located between adjacent turns, the turns of a layer coming from a same half of the optical fiber and being placed at a same distance from the coil axis.

According to the invention, the winding forms a coil having a sectored arrangement comprising, on the one hand, a regular stacking area in which the turns of optical fiber of a layer are juxtaposed to the turns of the adjacent layers so as to form at least one continuous sealing surface between two layers of turns, said at least one sealing surface preventing the passage of air and/or of glue between an external surface of the regular stacking area and at least one space located between the turns of the coil in the regular stacking area and, on the other hand, an overlap area in which portions of optical fiber linking different turns of a same layer and/or different layers of the winding cross each other, the overlap area comprising at least one continuous path of communication between an external surface of the coil in the overlap area and said spaces located between adjacent turns of the regular stacking area and the coil including glue distributed in a spatially homogeneous manner in said spaces located between adjacent turns of the regular stacking area of the coil.

According to a particular and advantageous embodiment, the winding pattern is of the quadrupolar or octopolar type.

Advantageously, the winding pattern is repeated periodically in a direction transverse to the coil axis.

According to a particular and advantageous embodiment, the material of the glue is chosen among the following materials: epoxy or acrylate polymer.

The invention also relates to a Sagnac-ring fiber-optic interferometer comprising at least one symmetrical-winding and sectored-arrangement optical fiber coil according to one of the described embodiments.

The invention will find a particularly advantageous application in the making of optical fiber coils for gyroscopes.

The present invention also relates to the characteristics that will be revealed during the following description and that will have to be considered in isolation or according to any technically possible combination thereof.

This description, which is given by way of non-limitative example, will allow a better understanding of how the invention can be implemented, with reference to the appended drawings in which:

DETAILED DESCRIPTION

Device

Figure 3:
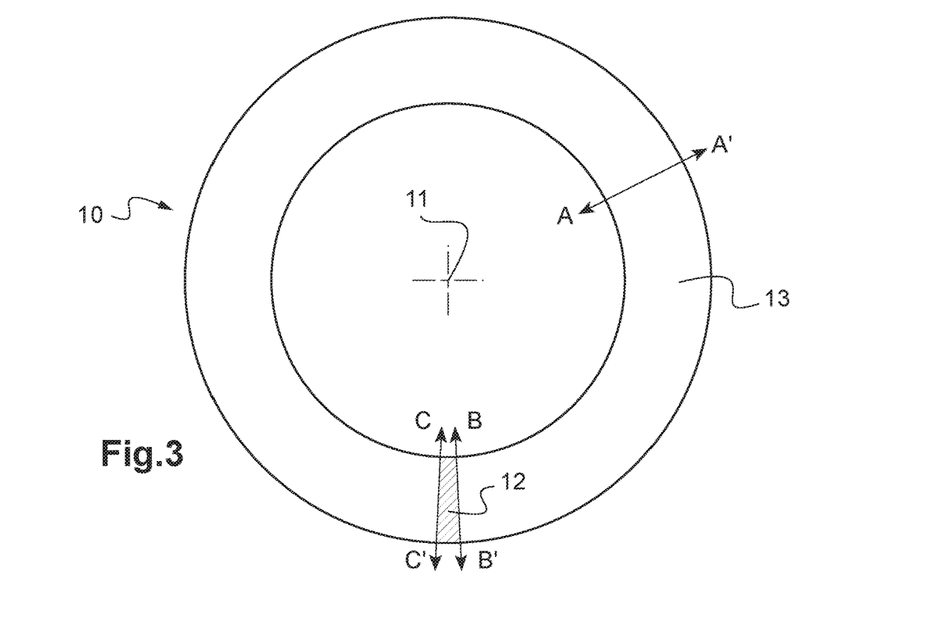
FIG. 3 schematically shows a top view of an optical fiber coil according to the invention.

FIG. 3 shows a top view of an optical fiber coil 10 according to an embodiment of the invention. The plane of FIG. 3 is perpendicular to the axis 11 of the coil 10. The coil 10 is of the symmetrical winding type, for example of the quadrupolar or octopolar type. The coil 10 has a generally cylindrical shape of axis 11 and of annular section in a plane transverse to the axis 11 of the coil 10 and of rectangular section in a plane passing through the axis 11 of the coil 10.

The optical fiber may be of the single-mode, multi-mode, polarizing, polarization-holding, single-core, multi-core type . . . . By way of non-limitative example, the optical fiber is of the polarization-maintaining type and the diameter of the optical fiber (core+cladding) is of 170 microns. The section of the optical fiber is generally circular.

In the present document, we can distinguish, on the one hand, a coil having a random arrangement and, on the other hand, a coil having a sectored arrangement.

In a random-arrangement coil, the winding may be symmetrical, starting from the middle of the optical fiber, but the segments of the fibers coming from the two halves of optical fiber cross each other in a random manner in the whole volume of the coil. Over the whole surface of a random-arrangement coil, we can see randomly distributed fiber crossings.

Figure 4:
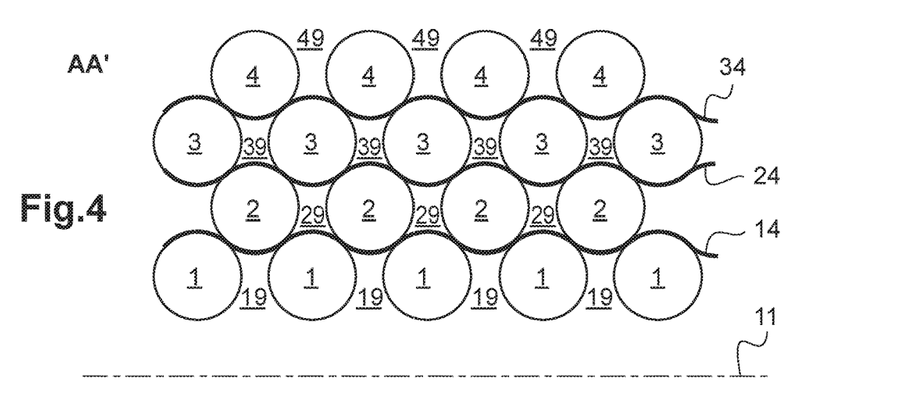
FIG. 4 schematically shows a view according to a section AA' of the optical fiber coil illustrated in FIG. 3.

On the contrary, in a sectored-arrangement coil, the coil includes at least two spatially separated areas: a regular stacking area 13 and an overlap area 12. In the regular stacking area 13, the segments of fiber of a layer are stacked on the segments of fiber of the layer immediately adjacent, by being arranged in a staggered manner in the grooves formed between the segments of the adjacent layer (FIGS. 2 and 4). The two half-lengths of the optical fiber cross each other in the well-delimited overlap area 12. Each layer corresponds to turns of the winding that turn in a same direction. However, contrary to a screw, the progression between turns of a same layer in the direction of the coil axis is not in helix, but by steps: the fiber is wound flat according to a radius to make a turn in the regular stacking area 13, then, in the overlap area 12, it is passed to the following turn of the same layer. Moreover, the progression between successive layers of a same sectored-arrangement coil is neither regular: a complete layer is made at a fixed distance from the coil axis corresponding to a given radius, then, at the overlap area 12, it is passed to the following layer, which has a higher radius than that of the layer on which it is wound.

In the following of the present disclosure, the interest will be about symmetrical-winding and sectored-arrangement coils.

In a dipolar winding, the direction of winding of the turns of a layer, along the coil axis, changes at each layer. A layer is herein denoted K, where K is an integer that is equal to 1 for the layer the closest to the coil axis and 2N for the layer the farthest from the coil axis. The layer K+1 is made in the same way as the layer K. The direction of winding of the layer K+1 is always inverted with respect to the direction of winding of the layer K on which it is applied. The layer K+1 comes inside the grooves of the layer K (as illustrated in FIG. 4), except at the overlap area 12 where it is passed to another layer. In a so-formed dipolar-winding coil, the overlap area 12 is unique.

In a coil of the quadrupolar type, the overlap area 12 comprises two distinct overlap areas BB' and CC'. The area BB' corresponds to the location of the turn overlaps between the layers K+0 and K+1. The area CC' corresponds to the location of the turn overlaps between the layers K+2 and K+3. Indeed, the fibers of passage from a layer to another one do not move up perpendicularly to the winding of the fibers, the turn overlap areas of the layers K+0 and K+1 are hence not straight above the turn overlap area of the layers K+2 and K+3.

The so-formed winding hence do not follow a regular helix in each layer. This sectored-arrangement winding with an overlap area 12 of limited extent has the advantage to provide a regular stacking that is seal-tight everywhere outside the overlap area 12, i.e. seal-tight in the whole regular stacking area 13. Particularly advantageously, the overlap area 12 is limited to a limited angular sector of the coil, corresponding for example to an angular sector having an apex angle comprised between 10 and 20 degrees.

More precisely, a three-dimension modelling of a symmetrical-winding and sectored-arrangement coil 10 allows highlighting the arrangement of the turns in the different areas of the coil.

The analysis of the coil in different section planes AA', BB', CC', respectively, makes appear different fiber arrangements between the layers of the fiber coil.

FIG. 4 schematically shows an example of view according to a section AA' of the coil 10 of FIG. 3. The plane AA' is a plane that includes the axis 11 of the coil 10 and located anywhere in the regular stacking area 13. In the simplified example illustrated in FIG. 4, the coil includes four layers of turns. The sections of turns of optical fiber are denoted from 1 to 4 according to the number, 1 to 4 respectively, of the corresponding layer.

It is observed that, in the plane AA', the turns of the optical fiber are not arranged according to a compact stacking. It is reminded that a compact stacking of discs of same diameter in a plane corresponds to an arrangement in which a disc is in contact with six adjacent discs, the centres of the six discs being arranged at the apexes of a hexagon.

On the contrary, in FIG. 4, it is observed that, in each layer, no turn is in contact with the adjacent turns of the same layer. Due to this arrangement, space exists between the adjacent turns of a same layer. The spaces between adjacent turns of the first layer 1 are denoted 19, and the spaces between adjacent turns of the second layer 2, the third layer 3 and the fourth layer 4, respectively, are denoted 29, 39, 49, respectively.

The spaces 19, 29, 39, 49 allow a making tolerance relatively to the fiber diameter fluctuations along the drawing and/or to the fiber mean diameter variations according to the drawings, and relatively to the space variations between the flanges of the mandrel. The contact of each turn of a layer K+1 with the two turns of the layer K is necessary to ensure the fiber drawing tension during the winding of the fiber. This drawing pressure takes for example the value of 20 g. Hence, the turns of the second layer 2 are in contact with four other turns: two turns of the first layer and two turns of the third layer 3. The turns of the third layer 3 are in contact with four other turns: two turns of the second layer 2 and two turns of the fourth layer 4. Finally, the turns of the fourth layer 4 are in contact with four other turns: two turns of the third layer 3, and two turns of the layer 5 (not shown).

Generally, the spaces 19, 29, 39, 49 are filled with glue during a conventional making method, comprising a step of application of glue after each turn layer winding.

Indeed, it is possible to fill the empty space between turns of a same layer by performing a step of glue application after the winding of each layer. However, the conventional technique of glue application does not prevent the enclosing of air bubbles in the so-applied layer of glue.

The plane of FIG. 4 makes appear several sealing lines 14, 24, 34 between adjacent layers. These sealing lines 14, 24, 34 result from the contacts between turns of adjacent layers in the regular stacking area 13. Hence, a sealing line 14 is formed between the layer 1 and the layer 2. By symmetry of revolution of FIG. 4 about the coil axis 11, out of the overlap area, the sealing line 14 is the trace, in the plane of FIG. 4, of a surface that ensures the sealing between the spaces 19 of the first layer 1 and the spaces 29 of the second layer 2 in the whole regular stacking area 13. Likewise, another sealing line 24 is formed between the layer 2 and the layer 3, and still another sealing line 34 is formed between the layer 3 and the layer 4. The sealing line 24, respectively 34, is the trace, in the plane of FIG. 4, of a seal-tight surface that extends, out of the overlap area 12, in the whole regular stacking area 13 of the coil.

The presence of sealing surfaces 14, 24, 34 explains why infiltration of the glue is generally not possible after the full winding of the optical fiber coil, through an external surface of a symmetrical-winding and sectored-arrangement optical fiber coil. It is also observed that, when a bubble of air is formed in a space 29, or 39 respectively, this bubble of air remains trapped between the sealing lines 14 and 24, or between the sealing lines 24 and 34, respectively. Such a bubble of air creates a spatial inhomogeneity in the optical fiber coil, liable to induce variations of thermal gradient in the optical fiber, at the origin of thermally induced non-reciprocities in the interferometric phase-shift measurements.

However, it results from the following analysis that the spatial distribution of the sections of turns is not uniform in the symmetrical-winding and sectored-arrangement optical fiber coil, but depends on the section plane.

Figure 5:
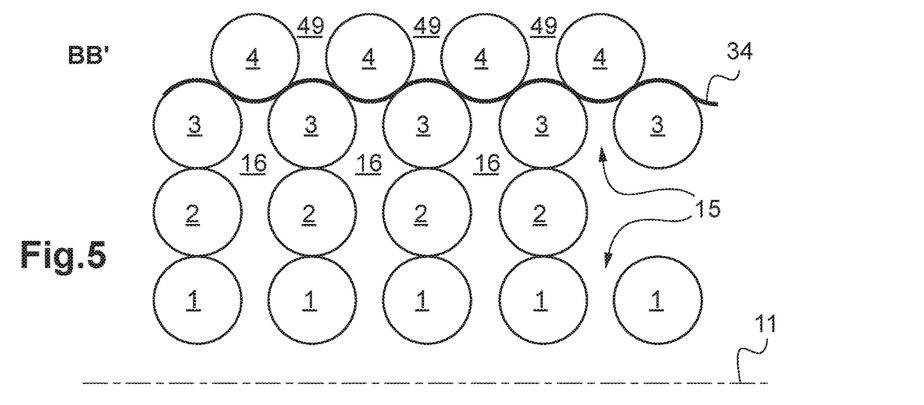
FIG. 5 schematically shows a view according to a section BB' of the optical fiber coil illustrated in FIG. 3.

Hence, FIG. 5 schematically shows a view according to a section BB' of the coil 10 of FIG. 3. The plane BB' is a plane that includes the axis 11 of the coil 10 and that is located in the overlap area 12 (or cross-over area or "jog zone"). The same elements are represented by the same reference signs as in FIG. 4.

It is observed that, in the plane BB', the turns of the optical fiber are not arranged according to the same stacking as in FIG. 4.

On the contrary, in FIG. 5, it is observed that the turns of the layers 1, 2 and 3 are regularly stacked according to planes transverse to the axis 11 of the coil. Hence, the turns of the first layer 1 are in contact with at most another turn of the second layer 2. The turns of the second layer 2 are in contact with at most two other turns: a turn of the first layer and a turn of the third layer 3. The turns of the third layer 3 are in contact with at most three other turns: at most one turn of the second layer 2 and at most two turns of the fourth layer 4. Finally, the turns of the fourth layer 4 are in contact with at most two other turns of the third layer 3. In FIG. 5 as in FIG. 4, in each layer, no turn is in contact with the adjacent turns of the same layer.

The arrangement of FIG. 5 makes appears a sealing line 34 between the last layer 4 and the last but one layer 3, that extends the sealing line 34 of FIG. 4. FIG. 5 highlights the existence of the openings 15, 16 that communicate between the layers 1, 2 and 3. Now, in a same coil 10, these openings 15, 16 communicate with the spaces 19, 29, 39 represented in FIG. 4 in the section plane AA'.

This analysis allows contemplating the making of an infiltration of glue from the openings 15 and/or 16 in the section plane BB'. The glue injected into the openings 15, 16 may infiltrate up to the spaces 19, 29, 39, for example by capillarity. By reverse effect, the openings 15, 16 may also be used to expel the air trapped in the spaces 19, 29 and/or 39. It results from the present analysis that the glue may infiltrate after the full winding of an optical fiber coil, in particular through the first layer 1, i.e. through the inside of the coil, in the plane BB'.

Nevertheless, due to the presence of a sealing line 34, the openings 15 and 16 do not communicate with the spaces 49 between the turns of the last layer 4. It is hence not possible for the glue to infiltrate after the full winding of an optical fiber coil, through the last layer 4, i.e. through the outside of the coil, in the plane BB'.

Figure 6:
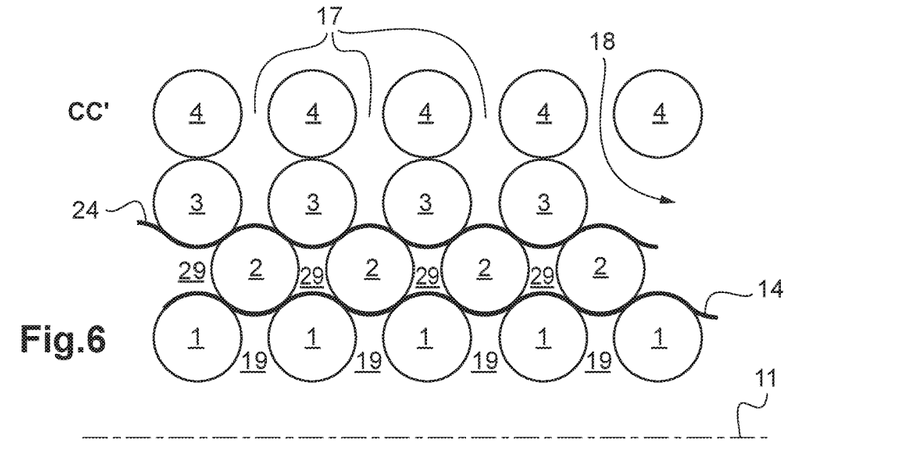
FIG. 6 schematically shows a sectional view according to a section CC' of the optical fiber coil illustrated in FIG. 3.

On the other hand, FIG. 6 schematically shows a view according to a section CC' of the coil 10 of FIG. 3. The plane CC' is a plane that includes the axis 11 of the coil 10 and that is located in the overlap area 12. The same elements are denoted by the same reference signs as in FIGS. 4 and 5.

In the plane CC', it is observed that the turns of the optical fiber are not arranged according to the stacking shown in FIG. 4, nor according to the stacking shown in FIG. 5.

On the contrary, in FIG. 6, it is observed that the turns of the layers 1, 2 and 3 are offset relative to each other (staggered stacking in the grooves of the previous layer), whereas the turns of the layers 3 and 4 are aligned along an axis transverse to the coil axis (stacking in concentric circles). Hence, the turns of the first layer 1 are in contact with at most two other turns of the second layer 2. The turns of the second layer 2 are in contact with at most four other turns: at most two turns of the first layer and at most two turns of the third layer 3. The turns of the third layer 3 are in contact with at most three other turns: at most two turns of the second layer 2 and one turn of the fourth layer 4. Finally, the turns of the fourth layer 4 are in contact with at most another turn of the third layer 3. In FIG. 6 as in FIGS. 4 and 5, in each layer, no turn is in contact with the adjacent turns of the same layer.

The arrangement of FIG. 6 makes appear a sealing line 14 between the first layer 1 and the second layer 2, and another sealing line 24 between the second layer 2 and the third layer 3, respectively. These sealing lines 14, 24 are in the continuous extent of the sealing lines 14, 24 of FIG. 4.

FIG. 6 highlights the existence of openings 17 that communicate between the layers 3 and 4 and an opening 18 that communicates between the layers 2, 3 and 4.

Here again, in a same coil 10, the openings 17, 18 communicate with the spaces 29, 39 and 49 shown in FIG. 4 in the section plane AA', as well as with the openings 15, 16 shown in FIG. 5 in the section plane BB'. Nevertheless, due to the presence of a sealing line 14, 24 respectively, the openings 17 and 18 do not communicate with the spaces 19, 29 respectively, located between the turns of the first layer 1, the second layer 2 respectively. It is hence not possible for the glue to infiltrate after the full winding of an optical fiber coil, through the first layer 1 and the second layer 2, i.e. through the inside of the coil, in the plane CC'.

Surprisingly, the small distance between the openings 15, 16 in the plane BB' and the openings 17, 18 in the plane CC' allows contemplating the feasibility of an infiltration of glue from the openings 17 and/or 18 in the section plane CC'. The glue injected into the openings 17 and/or 18 may infiltrate up to the spaces 19, 29, 39, and the openings 15, 16, for example by capillarity. By reverse effect, the openings 17, 18 may also be used to expel the air trapped in the spaces 29, 39 and/or 49.

Figure 7:
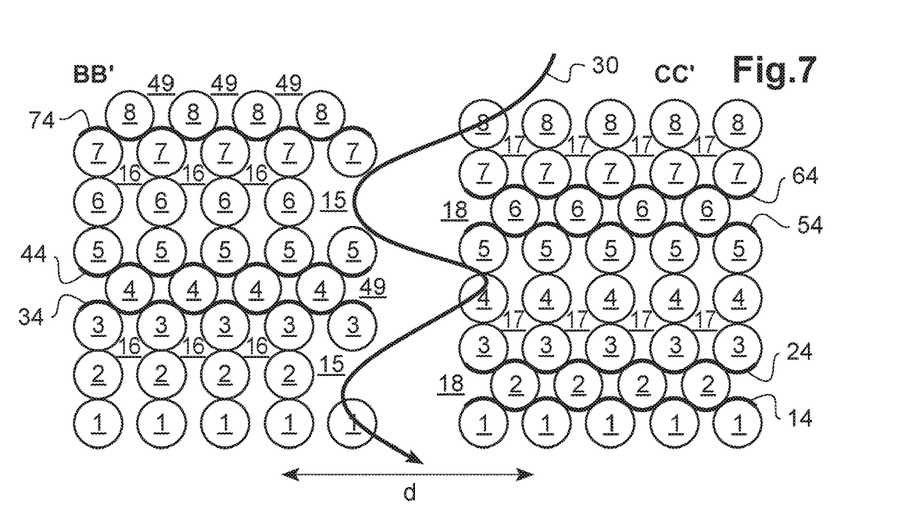
FIGS. 7 and 8 illustrate the principle of the infiltration of glue into the interstices of the coil from an external surface of the overlap area of the coil.

FIG. 7 shows a sectional view of an overlap area 12 in a quadrupolar-winding coil comprising eight layers of turns. The planes BB' and CC' are located on either side of the overlap area 12. On the side of the plane BB', sealing lines 34 (between the layers 3 and 4), 44 (between the layers 4 and 5) and 74 (between the layers 7 and 8) can be seen. On the side of the plane CC', sealing lines 14 (between the layers 1 and 2), 24 (between the layers 2 and 3), 54 (between the layers 5 and 6) and 64 (between the layers 6 and 7) can be seen.

In FIG. 7, it can be observed that there is always two sealing lines per group of four layers in the planes BB' and CC' (instead of four sealing lines per group of four layers in AA').

However, the sealing lines of BB' are not continuous with the sealing lines of CC'. On the other hand, the opening areas 15, 18 are close to each other. In an exemplary embodiment, the extent of the overlap area 12, in a direction transverse to the coil axis is of the order of the centimeter. Hence, a glue 22 can infiltrate from the external layer 8 to the internal layer 1 of the coil following a continuous path 30, in slalom, schematically shown in FIGS. 7 and 8. It is deduced from the present analysis that a sufficiently fluid glue 22 has the possibility to infiltrate after the full winding of an optical fiber coil, in particular through the last layer, i.e. through the outside of the coil, between the planes BB' and CC' and/or through the first layer 1, i.e. through the inside of the coil, between the planes BB' and CC'.

The one skilled in the art will easily apply such an arrangement to a coil having a symmetrical winding of the octopolar type, the coil having a sectored arrangement comprising on the one hand a regular stacking area, that has sealing lines between the different layers, and at least one overlap area, inside which the sealing lines are separated, and that allows an infiltration of glue from an external surface of the coil.

Method

The method of making an optical fiber coil includes a first step of winding an optical fiber around a mandrel.

Preferably, the winding of the optical fiber is a symmetrical winding with respect to the middle point of the optical fiber. For that purpose, the middle point of the optical fiber, i.e. the point located at half-distance from the two ends of the optical fiber, is determined. The middle point is fixed to the mandrel, and the winding is begun from this middle point. The winding is started by a first layer coming from a first half of the optical fiber. The winding of the following layers is continued so as to form a pattern comprising a same number N of layers of each half of the optical fiber, where N is a natural integer. The so-formed winding is symmetrical with respect to a plane comprising the coil axis and the middle of the optical fiber.

Advantageously, the pattern is of the quadrupolar or octopolar type.

The pattern may be repeated periodically by moving away from the coil axis, in order to increase the number of turns of the coil.

The winding forms a sectored arrangement, the coil includes at least two spatially separated areas: a regular stacking area 13 and an overlap area 12. Preferably, the extent of the overlap area 12 with respect to that to the regular stacking area 13 is limited.

The passage from a turn to another turn of the same layer is performed in the overlap area 12. For that purpose, the winding of the turns in a layer is performed in planes transverse to the coil axis and not in a helix. Likewise, the passage from a layer to the following layer of the pattern is performed in the overlap area 12.

It is hence obtained an optical fiber coil that has spaces 19, 29, 39, 49 in any plane AA' of the regular stacking area 13. In the overlap area 12, the optical fiber coil has openings 15, 16 in a plane BB' and openings 17, 18 in a plane CC'. At this stage of the making, the spaces 19, 29, 39, 49 are empty. The openings 15, 16, 17, 18 are also empty.

The application of glue to the optical fiber coil is performed after the end of the winding, i.e. after the winding of all the turns of the coil 10, contrary to the techniques in which the application of glue is performed after the winding of each layer of turns.

The place of the overlap area 12 located between the planes BB' and CC' is determined. This overlap area 12 is identifiable, for example on the outside of the coil, because it is the area in which the two halves of optical fiber of the coil cross each other. The two ends of the optical fiber can exit from the coil in the overlap area 12 or at another place 13 of the coil, this other place 13 being located outside the overlap area 12. In an exemplary embodiment, the overlap area 12 extends over a width of 1 to 3 cm on the external surface of a coil having an external diameter of the order of ten to twenty centimeters. The width is herein measured in a direction transverse to the coil axis.

The method then includes a step of making glue infiltrate along a path 30 that starts form an external surface of the coil and passes through the overlap area 12.

Figure 8:
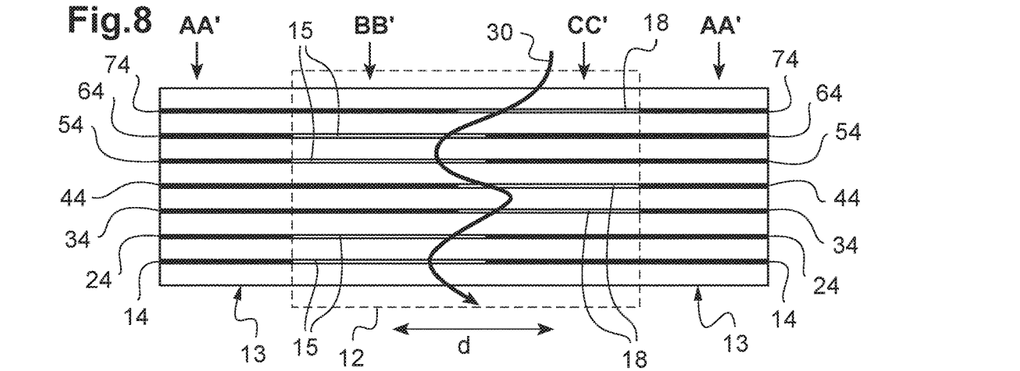

As illustrated in FIGS. 7 and 8, the infiltration of glue can be performed from the external layer 8 through the overlap area 12, following a zigzag path 30 between the sealing lines of the planes BB' and CC'. The width d of the area of the zigzag path 30 is of the order of the cm (about the ⅔ of the width of the area 12). The glue may also be infiltrated following the reverse path, from the internal layer 1 through the overlap area 12 following the reverse zigzag path 30. Hence, the glue infiltrates through the two sides of the coil into the spaces between the turns. The air initially present in the spaces between the sealing lines may be expelled via the openings of the overlap area 12.

The glue infiltration may be performed at ambient pressure.

In a first embodiment, the coil 10 is arranged so that its axis 11 is horizontal. In a first variant of the first embodiment, the overlap area is placed above the axis 11, for example at the vertical of the axis 11. The glue is then placed in contact with the openings of the overlap area 12 on the external layer of the coil. The glue infiltrates through openings in the overlap area 12 then propagates by capillarity and/or by gravity effect into the spaces 19, 29, 39, 49 . . . between the turns of the coil and into the other openings 15, 16 of the overlap area.

In a second variant of the first embodiment, the overlap area is placed under the axis 11, for example at the vertical of the axis 11. The glue is then placed in contact with the openings of the overlap area 12 on the first layer 1 inside the coil. The glue infiltrates through openings of the overlap area 12 then propagates by capillarity and/or by effect of the gravity into the spaces 19, 29, 39, 49 . . . between the turns of the coil and into the other openings of the overlap area.

The application of glue between the turns and between the layers of the optical fiber coil is then performed in the whole volume of the coil after the full winding of the coil.

In another particular and advantageous embodiment, described with reference to FIGS. 9 to 11, the infiltration of glue is performed in a vacuum chamber.

Figure 9:
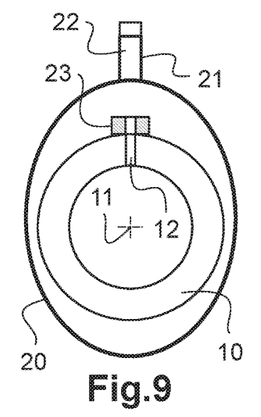
FIGS. 9 to 11 illustrate different steps of a vacuum-assisted method of making an optical fiber coil according to a particular embodiment of the invention.

In FIG. 9 is shown an optical fiber coil 10 after winding of the optical fiber and before application of glue.

The coil 10 is arranged inside a vacuum chamber 20. A pumping system (not shown), comprising for example one or several vacuum pumps in fluidic connection with the vacuum chamber 20, allows obtaining a primary vacuum in the vacuum chamber 20. The coil 10 being placed in the vacuum chamber, the vacuum is also formed between the turns of the coil, via the openings 15, 16, 17 and 18, which communicate with the vacuum chamber. As indicated hereinabove, the openings 15, 16, 17 and/or 18 also communicate with the spaces 19, 29, 39, 49 . . . between the turns of the coil. The vacuum is hence formed in all the inter-turn spaces of the coil.

A container 21 contains glue in liquid or gel form. At this stage of the method, the container 21 containing the glue 22 is outside the vacuum chamber 20. By way of example, the chosen glue is an epoxy or acrylate polymer.

Around the overlap area 12 of the coil 10 is arranged a ring 23 intended to hold the glue in contact with at least one portion of the overlap area 12, and more precisely around the area CC' that includes openings 17, 18 communicating with the outside of the coil. In the example of FIG. 9, the ring is arranged on the external layer of the coil parallel to the axis 11 of the coil 10.

Figure 10:
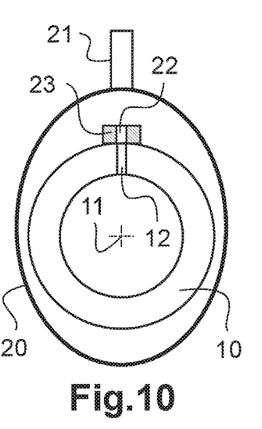

FIG. 10 illustrates another step of the method in which the glue 22 is introduced into the vacuum chamber 20, the chamber 20 remaining under vacuum. The glue 22 is hence placed in contact with the overlap area 12. More precisely, the glue 22 is in contact with the openings 17 and/or 18 of the external layer of the coil. In an embodiment, the glue 22 covers all the openings 17 and 18. In another embodiment, the glue 22 covers a portion of the openings 17 or 18.

Figure 11:
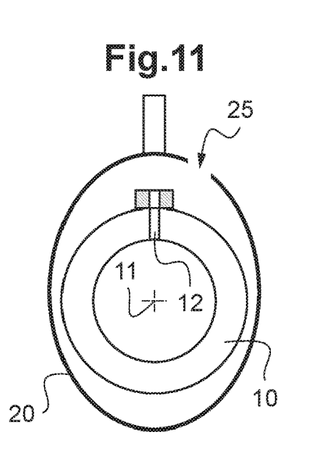

FIG. 11 illustrates a following step of the method in which the vacuum of the chamber 20 is broken, for example by creating an opening 25 between the vacuum chamber and the ambient air. Following the change of pressure in the vacuum chamber, the glue 22 is sucked up into the interstices of the coil, through the openings 17 and/or 18. The glue hence fully fills all the spaces 19, 29, 39, 49 and all the openings 15, 16, 17, 18.

The vacuum-assisted method of infiltration of glue allows limiting the risk of trapping bubbles of air inside the optical fiber coil.

This vacuum-assisted embodiment allows a wider choice of glue because the suction force of the coil is greater and allows the use of a relatively more viscous glue. The vacuum-assisted glue application method is rapid compared to an application of glue to each coil layer, in particular for the coils having a great number of layers.

It is obtained, in an easily repeatable manner, a symmetrical-winding optical fiber coil having a particularly homogeneous structure in the volume of the coil.

The invention claimed is:

1. A method of making a symmetrical-winding coil of optical fiber comprising the following steps:
  a. symmetrically winding an optical fiber around an axis, the winding starting from a point of the optical fiber located at equal distance from the two ends of the optical fiber, the winding forming a pattern comprising a same number N of layers of each half of the optical fiber, where N is a natural integer, a layer comprising a set of turns of optical fibers and spaces located between adjacent turns, the turns of a layer coming from a same half of the optical fiber and being placed at a same distance from the coil axis, and said winding forming a coil having a sectored arrangement comprising both a regular stacking area in which the turns of optical fiber of a layer are juxtaposed to the turns of the adjacent layer(s), so as to form at least one continuous sealing surface between two layers of adjacent turns, as well as an overlap area in which portions of optical fiber linking different turns of a same layer and/or different layers of the winding cross each other;
  b. making a glue infiltrate into the sectored-arrangement coil through an external surface of the overlap area so that the glue infiltrates through at least one continuous path of communication into the spaces located between adjacent turns in the regular stacking area, up to said at least one sealing surface.

2. The method of making an optical fiber coil according to claim 1, wherein at step a) the pattern of the winding is of the quadrupolar or octopolar type.

3. The method of making an optical fiber coil according to claim 1, wherein the adjacent turns of a first layer are arranged so as to form a groove between adjacent turns, and wherein the turns of another adjacent layer are arranged in a staggered manner in the groove of the first layer in the regular stacking area.

4. The method of making an optical fiber coil according to claim 1, wherein, before step b) the axis of the optical fiber coil is arranged horizontally and the overlap area is arranged at the vertical of the coil axis, and wherein the step b) comprises a step b1) of applying the glue to the overlap area, then a step b2) of making the glue infiltrate between the turns of the coil, by gravity and/or by capillarity and/or by suction.

5. The method of making an optical fiber coil according to claim 2, wherein, before step b) the axis of the optical fiber coil is arranged horizontally and the overlap area is arranged at the vertical of the coil axis, and wherein the step b) comprises a step b1) of applying the glue to the overlap area, then a step b2) of making the glue infiltrate between the turns of the coil, by gravity and/or by capillarity and/or by suction.

6. The method of making an optical fiber coil according to claim 1, wherein, before step b) the optical fiber coil is placed under vacuum in a vacuum chamber so that the spaces between the turns of the coil are vacuumed, and wherein in the step b) comprises a step of applying glue under vacuum to the overlap area; then a step of breaking the vacuum in the vacuum chamber, so as to suck the glue between the turns of the coil due to a difference of pressure between the vacuum chamber and the spaces located between the turns of the coil.

7. The method of making an optical fiber coil according to claim 2, wherein, before step b) the optical fiber coil is placed under vacuum in a vacuum chamber so that the spaces between the turns of the coil are vacuumed, and wherein in the step b) comprises a step of applying glue under vacuum to the overlap area; then a step of breaking the vacuum in the vacuum chamber, so as to suck the glue between the turns of the coil due to a difference of pressure between the vacuum chamber and the spaces located between the turns of the coil.

8. A symmetrical-winding optical fiber coil having an axis and comprising an optical fiber, said optical fiber being wound around the coil axis from the middle of the optical fiber, the winding of the optical fiber forming a pattern (Q) comprising a same number N of layers of each half of the optical fiber, where N is a natural integer, each of the layers comprising a set of turns of optical fiber and spaces located between adjacent turns, the turns of a layer coming from a same half of the optical fiber and being placed at a same distance from the coil axis,
wherein:
said winding forms a coil having a sectored arrangement comprising both a regular stacking area in which the turns of optical fiber of a layer are juxtaposed to the turns of the adjacent layer(s) so as to form at least one continuous sealing surface between two layers of turns, said at least one sealing surface preventing the passage of air and/or of glue between an external surface of the regular stacking area and at least one space located between the turns of the coil in the regular stacking area, as well as an overlap area in which portions of optical fiber linking different turns of a same layer and/or different layers of the winding cross each other, the overlap area comprising at least one continuous path of communication between an external surface of the coil in the overlap area and said spaces located between adjacent turns of the regular stacking area and wherein the coil includes glue distributed in a spatially homogeneous manner in said spaces located between adjacent turns of the regular stacking area of the coil.

9. The optical fiber coil according to claim 8, wherein the pattern (Q) of the winding is of the quadrupolar or octopolar type.

10. The optical fiber coil according to claim 8, wherein the pattern (Q) of the winding is repeated periodically in a direction transverse to the coil axis.

11. The optical fiber coil according to claim 8, wherein the material of the glue is chosen among the following materials: epoxy or acrylate polymer.

12. The optical fiber coil according to claim 9, wherein the material of the glue is chosen among the following materials: epoxy or acrylate polymer.

13. The optical fiber coil according to claim 10, wherein the material of the glue is chosen among the following materials: epoxy or acrylate polymer.

14. The optical fiber coil according to claim 8, wherein the optical fiber is a single-mode optical fiber, a polarization-maintaining optical fiber, a multi-core optical fiber.

15. The optical fiber coil according to claim 9, wherein the optical fiber is a single-mode optical fiber, a polarization-maintaining optical fiber, a multi-core optical fiber.

16. The optical fiber coil according to claim 10, wherein the optical fiber is a single-mode optical fiber, a polarization-maintaining optical fiber, a multi-core optical fiber.

17. The optical fiber coil according to claim 11, wherein the optical fiber is a single-mode optical fiber, a polarization-maintaining optical fiber, a multi-core optical fiber.

18. A Sagnac-ring fiber-optic interferometer comprising at least one optical fiber coil according to claim 8.

19. A Sagnac-ring fiber-optic interferometer comprising at least one optical fiber coil according to claim 9.

20. A Sagnac-ring fiber-optic interferometer comprising at least one optical fiber coil according to claim 11.

* * * * *